(12) United States Patent
Sano et al.

(10) Patent No.: US 6,173,876 B1
(45) Date of Patent: Jan. 16, 2001

(54) VULCANIZED FIBER SHEET HAVING A SERRATED CUTTING EDGE, A CARTON HAVING SAID SHEET ADHERED THERETO, AND A METHOD OF ADHESION THEREOF

(75) Inventors: Mitsuhiro Sano; Nobuo Wakabayashi; Hiroaki Mikamo; Keiichi Ikeda, all of Fuji; Isao Shoji, Toyonaka; Shiro Nagasawa, Shizuoka-ken; Nobuyuki Tohyama, Numazu, all of (JP)

(73) Assignee: Oji Paper Co., Ltd., Tokyo (JP)

( * ) Notice: Under 35 U.S.C. 154(b), the term of this patent shall be extended for 0 days.

(21) Appl. No.: 08/758,979

(22) PCT Filed: Sep. 14, 1992

(86) PCT No.: PCT/JP92/01176

§ 371 Date: Mar. 14, 1994

§ 102(e) Date: Mar. 14, 1994

(87) PCT Pub. No.: WO93/04935

PCT Pub. Date: Mar. 18, 1993

Related U.S. Application Data

(63) Continuation of application No. 08/211,091, filed on Mar. 14, 1994, now abandoned.

(30) Foreign Application Priority Data

Sep. 12, 1991 (JP) .................................................. 3-81640
Apr. 10, 1992 (JP) .................................................. 4-116773

(51) Int. Cl.$^7$ ................................................. B26F 3/02
(52) U.S. Cl. ............................. 225/39; 225/43; 225/49; 225/56; 225/77; 225/91
(58) Field of Search ............................... 225/39, 43, 48–9, 225/56, 77, 91

(56) References Cited

U.S. PATENT DOCUMENTS

| | | | |
|---|---|---|---|
| 3,169,685 | * | 2/1965 | Reilly ...................................... 225/91 |
| 3,622,751 | * | 11/1971 | Larive et al. ....................... 83/365 X |
| 4,580,709 | * | 4/1986 | Roccaforte ............................. 225/48 |
| 4,679,718 | * | 7/1987 | Kai et al. ............................... 225/48 |
| 4,822,440 | * | 4/1989 | Hsu et al. ......................... 156/307.5 |
| 5,135,784 | * | 8/1992 | Okumura ........................... 225/43 X |
| 5,185,012 | * | 2/1993 | Kelly .................................... 51/295 |
| 5,226,571 | * | 7/1993 | Eastwood et al. ..................... 225/49 |
| 5,306,224 | * | 4/1994 | Okumura ........................... 225/91 X |
| 5,314,513 | * | 5/1994 | Miller et al. ............................ 51/295 |
| 5,732,868 | * | 3/1998 | Gammon, Jr. ......................... 225/48 |

FOREIGN PATENT DOCUMENTS

| | | |
|---|---|---|
| 1-114532 | 8/1989 | (JP) . |
| 1-294429 | 11/1989 | (JP) . |
| 3-26719 | 3/1991 | (JP) . |

\* cited by examiner

*Primary Examiner*—M. Rachuba
(74) *Attorney, Agent, or Firm*—Flynn, Thiel, Boutell & Tanis, P.C.

(57) ABSTRACT

The present invention is a sheet having a serrated cutting edge attached to a carton case containing a roll of a cooking sheet such as a synthetic resin film, paper sheet and metallic foil, the sheet having a serrated cutting edge used for cutting the cooking sheet. The sheet having a serrated cutting edge is made of a vulcanized fiber. A moisture-proof film of a synthetic resin is formed on the two surfaces of a vulcanized fiber blank in order to make the most of the rigidity and elasticity which are advantages of the vulcanized fiber and decreases moisture absorption which is a disadvantage thereof. The invention also is a carton to which the sheet having a serrated cutting edge is adhered to as well as to a method of adhering the sheet having a serrated cutting edge to the carton by utilizing the moisture-proof film and ultrasonic adhesion.

17 Claims, 13 Drawing Sheets

VULCANIZED FIBER SHEET HAVING A SERRATED CUTTING EDGE, A CARTON HAVING SAID SHEET ADHERED THERETO, AND A METHOD OF ADHESION THEREOF

This application is a continuation of U.S. Ser. No. 08/211,091, filed Mar. 14, 1994 now abandoned.

TECHNICAL FIELD

The present invention relates to a sheet having a serrated cutting edge for cutting what is called a cooking sheet such as a wrapping film of a synthetic resin, paper sheet and metallic foil, and to a carton case to which said sheet having a serrated cutting edge is adhered. The invention also includes a method of adhering said sheet having a serrated cutting edge to said carton case. Particularly, the invention is characterized by said sheet being made of a vulcanized fiber having a special composition.

BACKGROUND ART

A material generally called a cooking sheet, such as a wrapping film of a synthetic resin and aluminum foil, used in the kitchen, etc. for wrapping foods or the like, is usually rolled up and contained in a paperboard carton case (hereinafter referred to as "carton"). At the time of use, an end of said film or aluminum foil is pulled out of the carton and cut to a desired length by means of a cutting member or a serrated cutting edge provided on a front portion or a cover portion of said carton (hereinafter referred to as "cutting edge" or "serrated cutting edge").

The cutting edge provided on the carton is generally made of a metal. Recently a cutting edge made of a vulcanized fiber has been put on the market because while a metal cutting edge is likely to injure the hand when it is grasped, the vulcanized fiber cutting edge is free from such a possibility. Furthermore, the vulcanized fiber cutting edge may be burned together with the carton when the film or the foil has been used up.

While the vulcanized fiber cutting edge has the above-mentioned advantages, it also has the disadvantage that because of the properties of the material, the vulcanized fiber cutting edge absorbs moisture and elongates when it is put in a moist atmosphere for a long period of time. In an attempt to moisture proof the vulcanized fiber cutting edge, a vulcanized fiber blank has been coated with a melamine resin liquid, glyoxal solution, polyurethane resin liquid, etc. before a cutting edge is formed. However, none of these attempts have been very successful and further improvements are required. If the vulcanized fiber cutting edge is put in the kitchen, etc. which often has a high humidity, the cutting edge may be elongated by moisture in the atmosphere. According to the degree of water-resisting or waterproofing treatment, elongation by moisture absorption may, in an extreme case, partially separate the cutting edge from the carton to which the cutting edge is adhered and reduce the function of the cutting edge.

It is a first object of the present invention to provide a sheet for a cutting edge for cutting a material dispensed from within the carton, said cutting edge always having a satisfactory cutting function without being affected by moisture in the atmosphere. In other words, said first object of the present invention is to provide a vulcanized fiber sheet having a serrated cutting edge, said sheet having a very high dimensional stability.

It is a second object of the present invention to improve the shape of the cutting edge so that it can smoothly cut a film of polyvinyl chloride, etc. having a relatively large elongation.

It is a third object of the present invention to provide a novel method of adhering a sheet having a cutting edge to the carton, said method preventing said sheet from peeling off from the carton, even when the sheet is thin. In this method, the cutting edge can be adhered to the paperboard of which the carton is made at the same speed as when a usual metal cutting edge is attached by caulking,

DISCLOSURE OF INVENTION

The present invention solves the above-mentioned problems by forming a moisture-proof film having a low moisture permeability on the two surfaces of a vulcanized fiber sheet having a serrated cutting edge, said moisture-proof film being any one chosen from a polyolefin resin film, polyester resin film and polyvinylidene chloride resin film. Typical examples of said resin film are a polyethylene film, PET film, etc.

While said moisture-proof film may be formed directly on the surfaces of the vulcanized fiber, it is also possible to subject the vulcanized fiber to a water-resisting or water-proofing treatment, for example, by applying thereto a water-resisting agent such as said melamine resin and glyoxal before said moisture-proof film is formed.

To improve the adhesion between said moisture-proof film and said vulcanized fiber, the following means may be used: coating said vulcanized fiber in advance with an anchor coating agent such as polyethyleneimine; or subjecting a resin film to corona discharge before said resin film is applied to said vulcanized fiber so as to form said moisture-proof film.

In a usual serrated cutting edge, the shape of each cutting tooth and the distribution of the cutting teeth are of little importance. In the serrated cutting edge formed on the moisture-proof vulcanized fiber blank according to the present invention, said cutting edge has a certain length and the cutting teeth of said cutting edge are distributed straight. It has been found that if each cutting tooth in the central portion of said cutting edge has the shape of an isosceles triangle and each cutting tooth in the remaining end portions of said cutting edge has the shape of a scalene triangle inclined outward, the cutting edge can even cut well a film having a relatively large elongation.

The serrated cutting edge of the sheet may be either formed straight as mentioned above or bent angularly in the lengthwise direction.

In the present invention, the serrated cutting edge already formed as mentioned above, particularly the sides of each cutting tooth, may be subjected to the water-resisting treatment. In this case, the serrated cutting edge already formed and portions near said cutting edge are subjected to any of the following treatments. One of them is to coat or impregnate the sides of the cutting teeth with an organic solvent solution of any of the above-mentioned resins adapted to have a relatively high fluidity or with a water-resisting agent not mentioned above. Also, a waterproof film may be formed on the serrated cutting edge by applying an ionizing radiation curing resin such as an electron beam curing resin (EB resin) and an ultraviolet curing resin (UV resin) to the sides of the cutting teeth and hardening said resin. The hardened waterproof film of said ionizing radiation curing resin is very hard so that it prevents moisture from permeating through the sides of the cutting teeth and increases the strength of the cutting edge itself. Said water-resisting treatment includes waterproofing treatment for preventing the permeation of moisture.

The above-mentioned waterproof film may be formed on the sides of the cutting teeth as a second treatment after a moisture-proof film is formed on the two surfaces of the vulcanized fiber. Also, it is possible to form a moisture-proof film on the two surfaces of the vulcanized fiber blank which is permeated in advance with a waterproofing agent and then form a serrated cutting edge thereon.

In the present invention, the vulcanized fiber sheet provided with said serrated cutting edge is attached to a carton as mentioned above. The sheet may be attached to the carton by means of a suitable adhesive (including a pressure-sensitive adhesive). If the following method of adhesion is used, various superior effects as mentioned below will be obtained as compared with the case where said adhesive is used.

The method of adhesion comprises placing the sheet having the serrated cutting edge upon a piece of paperboard for the carton, and then adhering said sheet to said paperboard through the moisture-proof film on the surface of said sheet by an ultrasonic adhesion method. It has been confirmed that such adhesion is free from peeling even in a high-humidity atmosphere.

Thus, according to the present invention, it is possible to maintain the vulcanized fiber sheet having said serrated cutting edge in a state less liable to be affected by humidity. Therefore, the sheet having said serrated cutting edge has an excellent dimensional stability, even though the sheet is made of vulcanized fiber. Consequently, the serrated cutting edge has good cutting ability. When the sheet is adhered to the carton. the adhesion is strong and free from peeling.

BEST MODE FOR CARRYING OUT THE INVENTION

Figure 1:
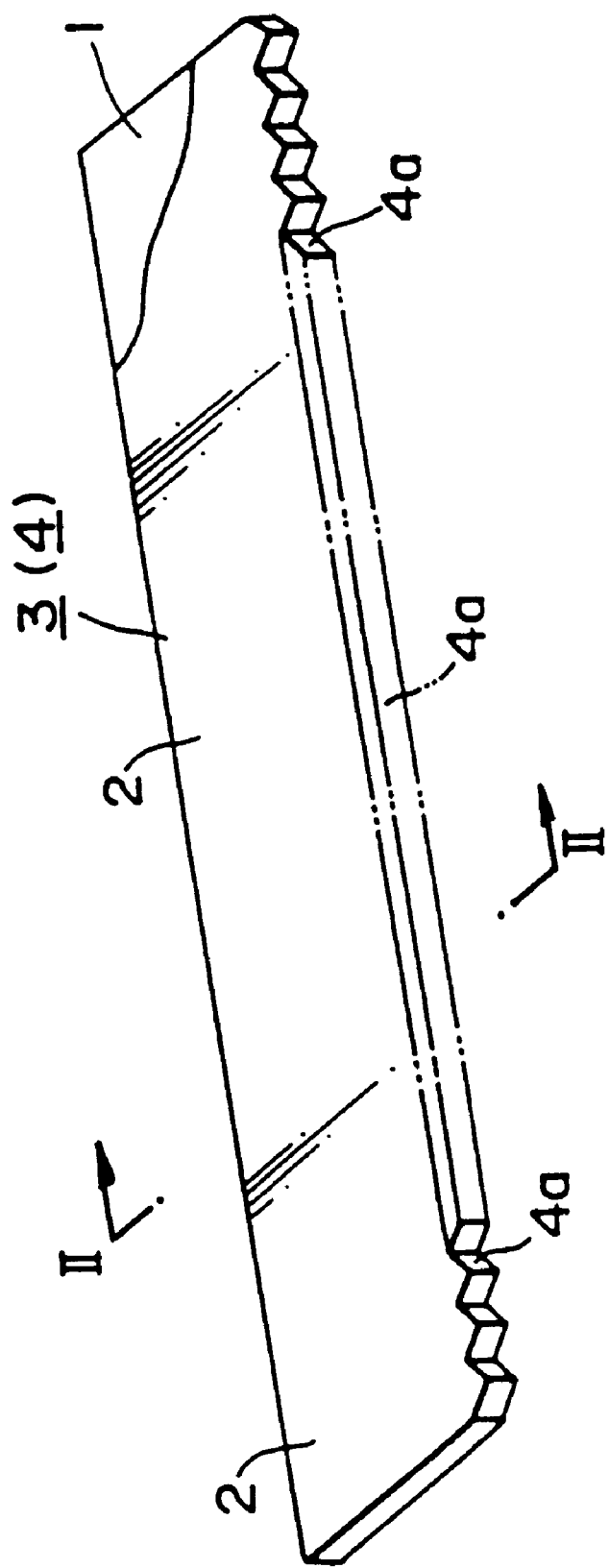
FIG. 1 is a perspective view showing an embodiment of a vulcanized fiber sheet having a serrated cutting edge according to the present invention.

The main material used in the present invention is a vulcanized fiber which, as is generally known, comprises a cotton fiber or chemical pulp made into a base paper without sizing, said base paper being treated by a zinc chloride solution having a certain concentration (Baume degree generally being 65 to 74). The vulcanized fiber has properties intermediate thereof of wood and metal. The vulcanized fiber has high elasticity and rigidity, is much lighter than metal and has a high resistance to various oils.

The present invention obtains the above-mentioned sheet having a serrated cutting edge by utilizing said properties of the vulcanized fiber and subjecting said vulcanized fiber to special treatment. By adhering said sheet to a carton, the present invention provides a carton having a useful cutting edge which replaces the conventional cutting edge of metal. Said sheet having a serrated cutting edge has a thickness of 0.2 to 0.5 mm, preferably 0.25 to 0.35 mm. As the thickness decreases, the cutting edge cuts better.

In the present invention, a blank of said vulcanized fiber may be used directly as a material of the sheet having a serrated cutting edge. Alternatively, the vulcanized fiber may be made resistant to water in advance by being coated or impregnated with a melamine resin liquid, glyoxal solution, etc.

The moisture-proof film may be formed on the surface of said blank by any of the following methods: Coating said blank with a resin having a low moisture permeability, said resin being in a state of emulsion or solution, said resin being selected from said polyolefin resin, polyester resin, polyvinylidene chloride resin, etc.; dry laminating said resin in a state of film; and extruding said resin in a molten state onto the surface of said blank.

A preferable method comprises a polyolefin resin having a low moisture permeability such as polyethylene, polypropylene and methyl pentene polymer being extruded in a molten state onto the surface of the vulcanized fiber blank.

In adhering said sheet having a serrated cutting edge to the carton blank, an emulsion of a polyethylene resin, etc. may be applied in advance as an adhesion accelerator to the carton blank at a position to which said sheet is to be adhered, a film thus formed in advance increases the adhesion between said sheet and said carton blank.

The present invention will now be described in detail with reference to examples and comparative examples.

EXAMPLE 1

First, a method of producing a vulcanized fiber blank used in making said vulcanized fiber sheet having a serrated cutting edge will be described in brief. A paper stuff comprising 50% of NBKP and 50% of NDSP was made into a base paper having a basis weight of 105 g/m$^2$. Two pieces of this base paper were immersed in a zinc chloride solution of 69° Be and 40° C., subjected to pressing, adhesion under heat and pressure and air aging, then put into a tank containing a zinc chloride solution of about 30° Be, and aged in a tank containing a zinc chloride solution having a low concentration so that zinc chloride melted away. Then, the base paper was washed in a tank containing hydrochloric acid, and then zinc chloride was removed in a rinsing tank. After being predried, the base paper was coated on its two surfaces with a solution of melamine formalin resin (10 g/m² in terms of solid matter), dried by means of a cylinder drier, and further calendered. Thus, a water-resistant vulcanized fiber blank having a thickness of 0.25 mm was obtained.

Both of the surfaces of the vulcanized fiber blank were anchored by applying thereto polyethyleneimine in an amount of 3 g/m² in terms of solid matter and drying said polyethyleneimine. Then, low-density polyethylene in a molten state was extruded onto the anchored surfaces. Thus, a moisture-proof film comprising a low-density polyethylene layer having a thickness of 20 μm was formed on the two surfaces of vulcanized fiber blank.

Figure 2:
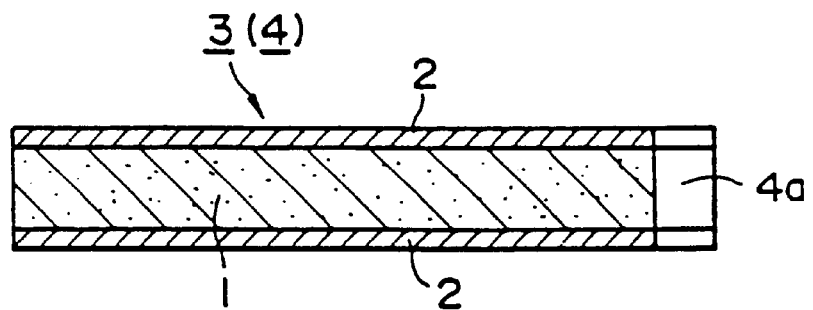
FIG. 2 is an enlarged sectional view taken along line II—II of FIG. 1.
Figure 3:
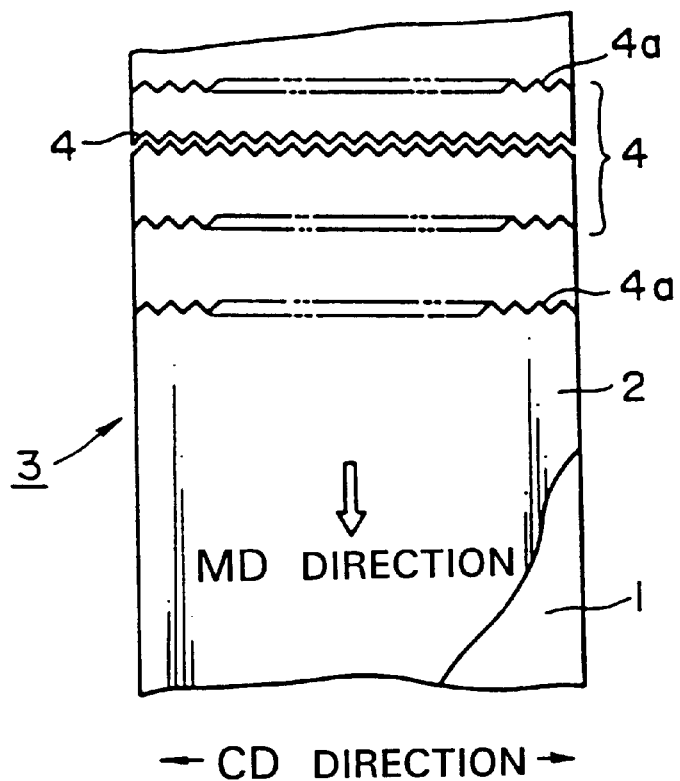
FIG. 3 is a plan view showing a case where a vulcanized fiber blank is provided on both of its surfaces with a moisture-proof film and then serrated cutting edges are formed thereon in the cross direction perpendicular to the machine direction so as to obtain sheets each having serrated cutting edges.
Figure 4:
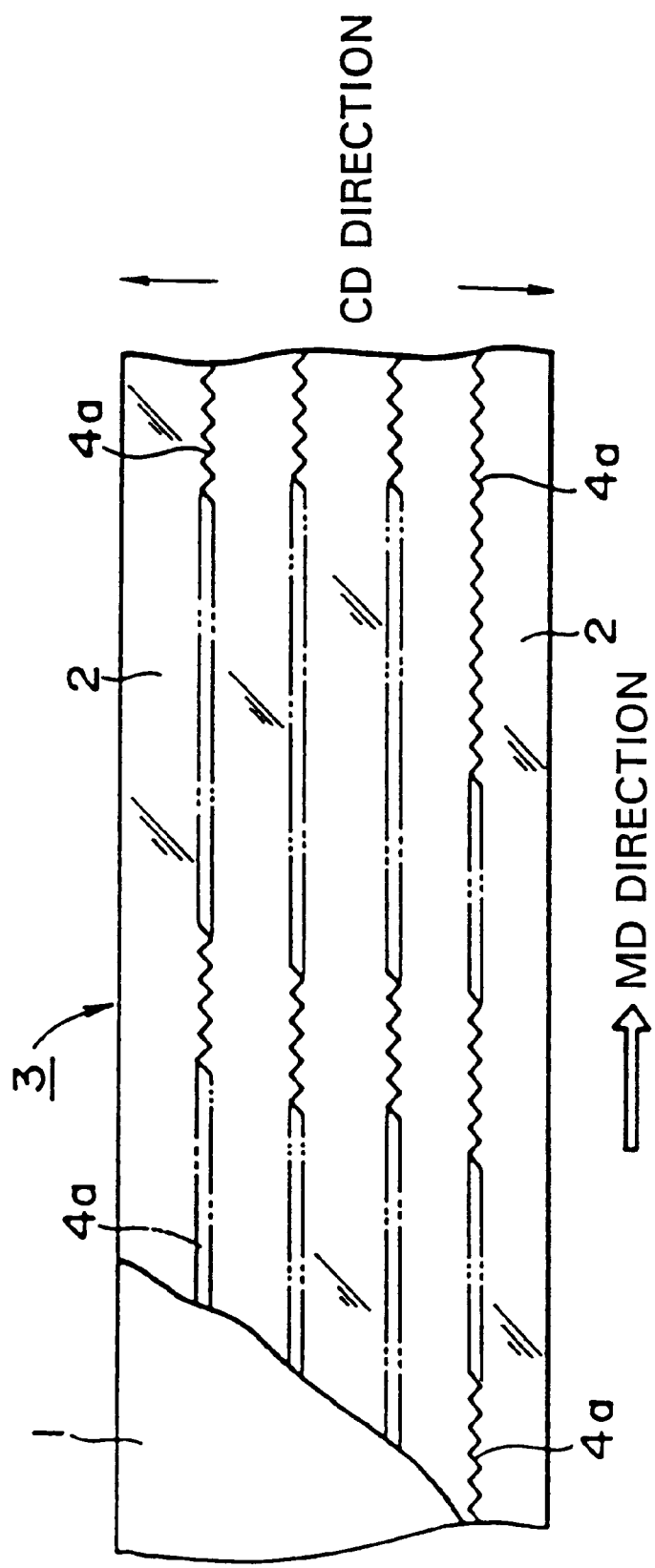
FIG. 4 is a plan view showing a case where serrated cutting edges are formed on said vulcanized fiber blank in the machine direction so as to obtain sheets having serrated cutting edges.

Now, a vulcanized fiber plate 3 shown in FIGS. 2 to 4 was obtained, said vulcanized fiber plate 3 comprising a long vulcanized fiber blank 1 provided on its two surfaces with a moisture-proof film 2 which comprises said polyethylene layer. Then, vulcanized fiber sheets 4 having serrated cutting edges were easily obtained by machining said vulcanized fiber plate 3 by means of a serrated cutting edge former or by blanking said vulcanized fiber plate 3 by means of a press, etc.

Said vulcanized fiber blank has directional properties attributable to the orientation the fiber at the time of making said blank. Fiber constituting said blank has a tendency to be arranged in parallel in the papermaking direction. Consequently, the physical properties of the blank differ according to the directions of the blank, i.e., the machine direction or the lengthwise direction of the blank and the cross direction perpendicular thereto. When the blank has absorbed moisture, the rate of expansion and contraction in the cross direction in FIGS. 3 and 4 is 6 to 7 times as large as that in the machine direction. For example, the elongation at a relative humidity of 65 to 90% (left for 24 hours at an atmospheric temperature of 23° C.) in the machine direction is 0.4%, while that in the cross direction is 2.7%.

Therefore, if serrated cutting edges are formed as shown in FIG. 3 in making said blank into sheets having serrated cutting edges and one of these sheets is adhered to a carton, then the sheet having a cutting edge warps on the carton because of said elongation and partially peels off. As a result, the serrated cutting edge loses its sharpness and becomes very dull. If serrated cutting edges are formed in the machine direction as shown in FIG. 4, then the above-mentioned problem does not arise because the rate of expansion and contraction in the machine direction is small. In this case, small expansion or contraction offers no problem in practice because such small expansion or contraction corresponds with the expansion or contraction of the carton.

It is one of the objects of the present invention to solve the above-mentioned problem of the cross direction. To attain this object, a moisture-proof film is formed on both surfaces of said blank. According to the present invention, in the blank 3 treated as mentioned above, the serrated cutting edges (See reference symbol 4a or 4b) may be formed either in the machine direction or in the cross direction.

In the present invention, the moisture-proof film 2 is formed on both of the surfaces of said blank 1 with the intention mentioned above and then a long rectangular sheet 4 having a serrated cutting edge as shown in FIG. 1 is obtained. For example, a flat sheet of 0.8 cm×30 cm having a thickness of about 0.25 mm was obtained.

EXAMPLE 2

To waterproof the sides of the cutting teeth in the cutting edge 4a of the sheet 4 obtained in Example 1, an epoxy acrylate ultraviolet curing resin having a viscosity of 400 cp, for example, was applied to portions around said serrated cutting edge by means of a suitable gravure roll and then a film of the ultraviolet curing resin was formed on the sides of the cutting teeth in the cutting edge by applying ultraviolet rays thereto.

EXAMPLE 3

A moisture-proof film of polyethylene was formed on the two surfaces of a vulcanized fiber blank in the same way as in Example 1 except that said vulcanized fiber blank had a basis weight of 400 g/m², and then cutting edges were formed by blanking. Thus, a sheet having serrated cutting edges was obtained. The sheet had a thickness of 0.35 mm. The sheet had a cutting edge on each of the two longer sides. The sides of the cutting teeth in each cutting edge was made waterproof in the same way as mentioned above.

The moisture-proof film 2 on one of the two surfaces of said sheet 4 having serrated cutting edges was activated by corona discharge so that the film had a surface tension of 40 dynes/cm and allowed easy adhesion. Then, the sheet was adhered by means of a pressure sensitive adhesive to a predetermined position in a developed carton blank shown in FIG. 5.

Figure 5:
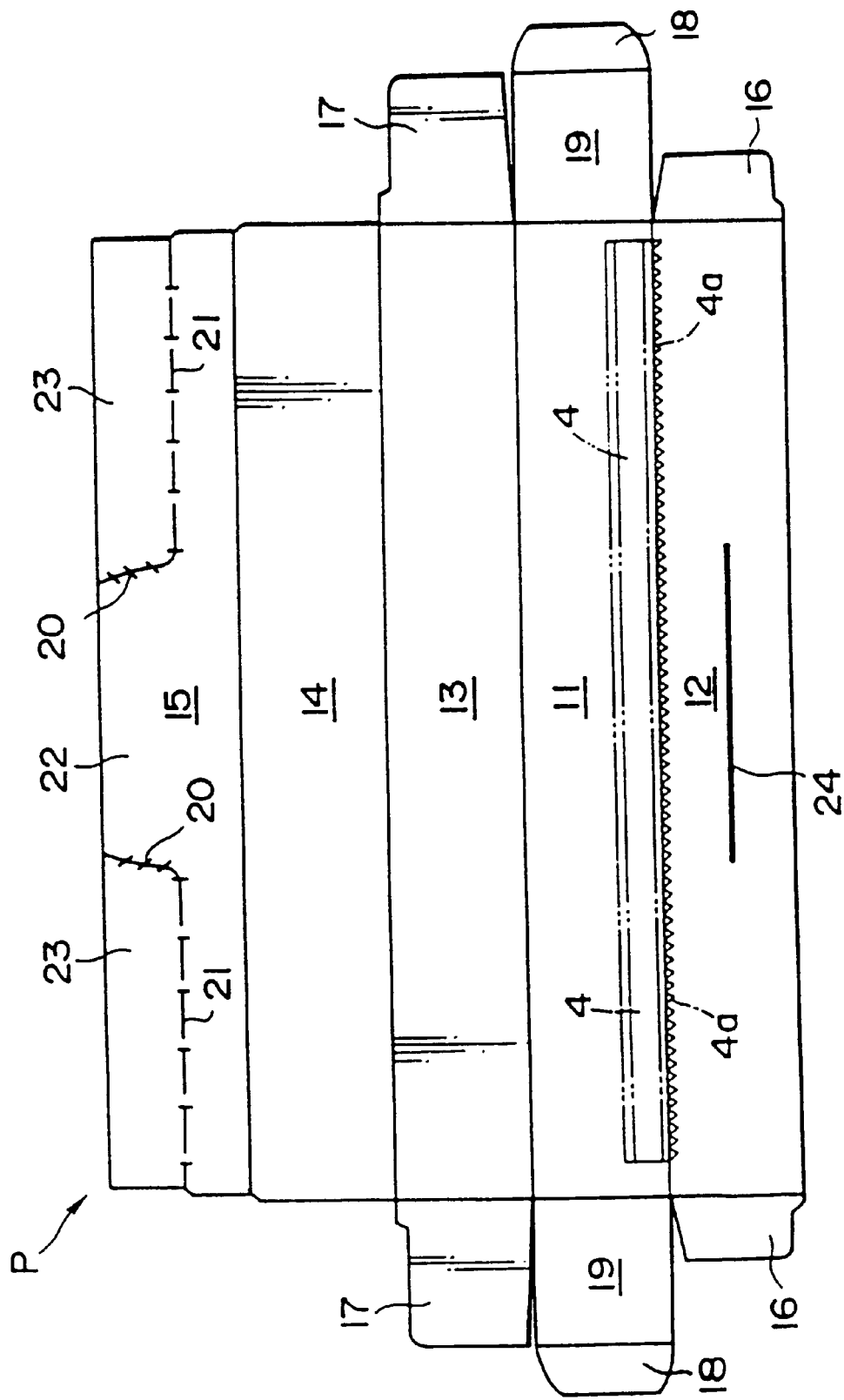
FIG. 5 is a view showing an embodiment of a carton blank provided with one of said sheets having serrated cutting edges.
Figure 6:
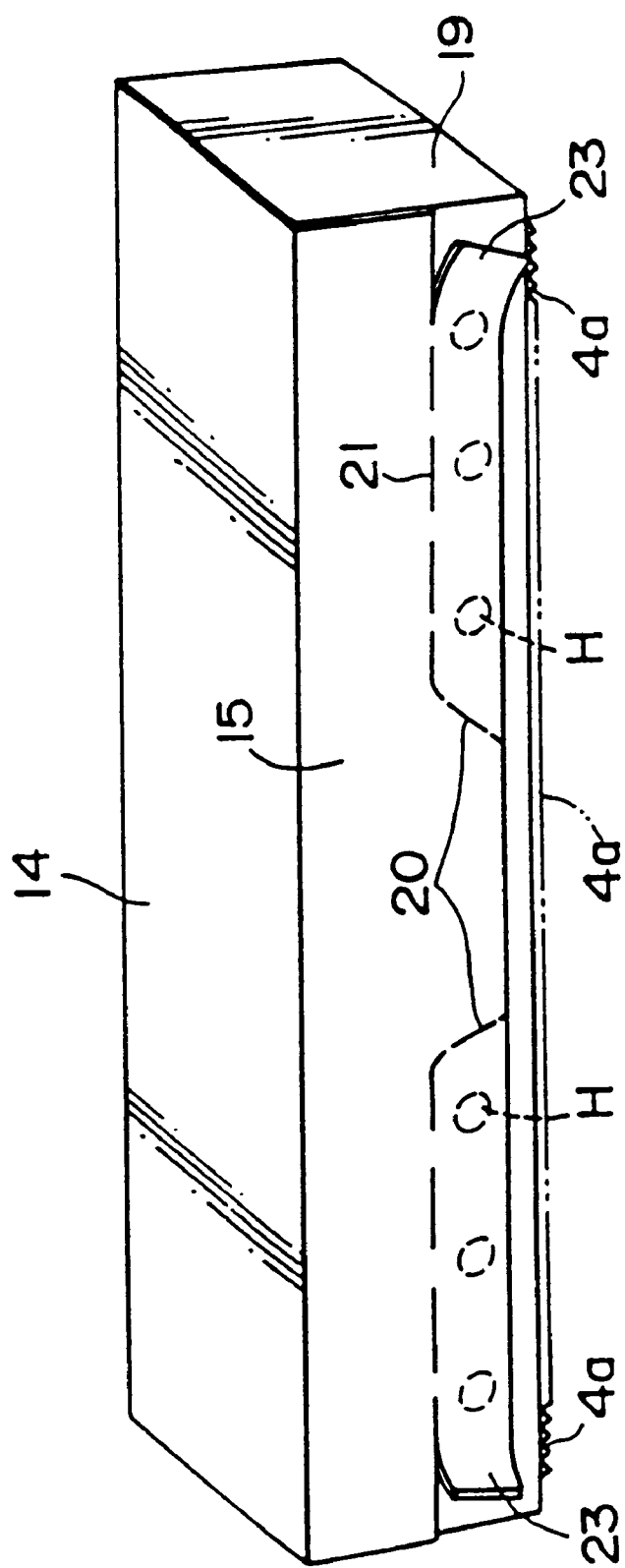
FIG. 6 is a perspective view of a carton made by using the carton blank shown in FIG. 5. The carton is being opened.

The construction of the carton will be described with reference to FIGS. 5 and 6. Reference symbol P represents a carton blank of a paperboard (thickness 0.8 mm) having a basis weight of 350 g/m². Reference symbol 11 represents a rectangular bottom wall panel formed on the blank by fold lines. A longer side, which is a lower side in FIG. 5, of said bottom wall panel continues to a front wall panel 12. Another longer side of said bottom wall panel continues through similar fold lines to a rear wall panel 13, top wall panel 14 and cover panel 15 which adjoin one another. Said front wall panel 12 and rear wall panel 13 respectively continue through fold lines at both ends or shorter sides to glue flaps 16 and 17. Said bottom wall panel 11 continues through fold lines at both ends or shorter sides to side panels 19 each having a flap 18.

Said cover panel 15 is provided with a pair of inclined perforated lines 20, each continuing to straight perforated lines 21. A finished carton is opened by means of these perforated lines. After being finished, the carton is opened by removing parts of the cover panel 15, which are temporarily attached pieces 23 surrounded by said perforated lines, from the carton body. Also, the cover panel is fixed in place by inserting an insertion piece 22 between said inclined perforated lines 20 into a holding slit 24 provided on said front wall panel 12.

Said sheet 4 having serrated cutting edges is adhered to the lower surface of said bottom wall panel 11 along a fold line between said bottom wall panel and said front wall panel 12. The sheet is adhered so that its serrated cutting edge 4a protrudes slightly from said fold line. Preferably the sheet to be adhered to the carton is slightly shorter than the longer side of the bottom wall panel 11.

Figure 7:
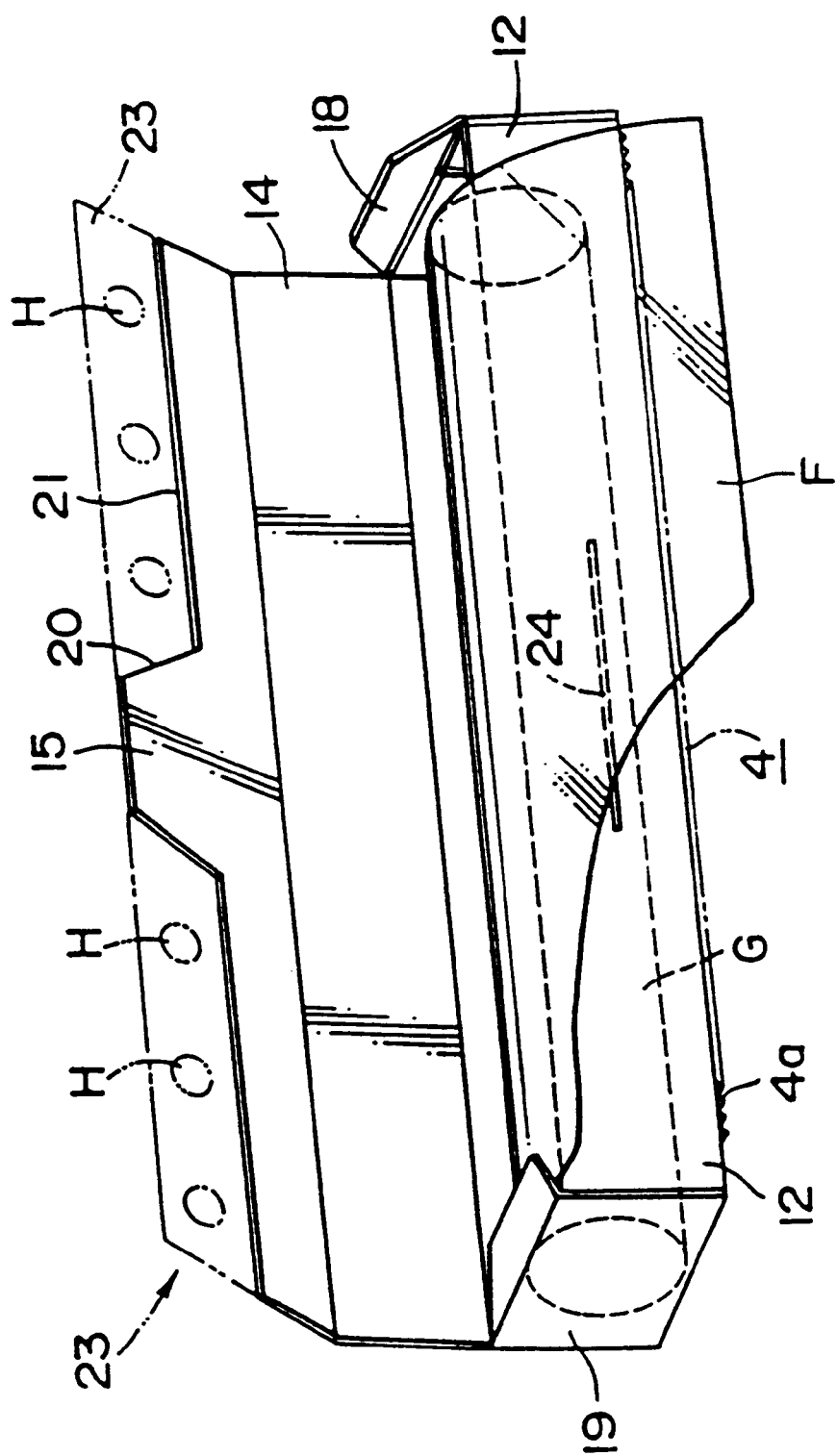
FIG. 7 is a perspective view showing a state in which the carton is open and a cooking sheet rolled up within the carton is being pulled out and cut.

In setting up a carton from the developed carton blank, said front wall panel 12, rear wall panel 13 and side panels 19 are vertically erected along fold lines from said bottom wall panel 11, glue flaps 16 and 17 are adhered inside said side plates 19, then a rolled cooking sheet (See reference symbol G in FIG. 7) is put into the carton. After that, the opening of the carton is closed by the top wall panel 14 and cover panel 15. Then, the cover plate is fixed to the front wall panel 12 by the spot adhesion H of the temporarily attached pieces 23 thereto.

To take out the cooking sheet F contained within the carton as mentioned above, the carton is opened by cutting off the temporarily attached pieces 23 which are, spot adhered, along the perforated lines, the end of the wrapping film or sheet F of said roll G is held between fingers, then a desired length thereof is pulled out. The film, etc. is pulled down along the front wall panel 12 and cut to the desired length by being pushed against the front wall panel 12, that is, by means of the serrated cutting edge 4a protruding from the lower edge of the front wall panel 12. After the cutting, said insertion piece 22 is inserted into said holding slit; 24 in the front wall panel 12 to close the carton, thereby preventing dust from entering the carton.

EXAMPLE 4

Figure 8:
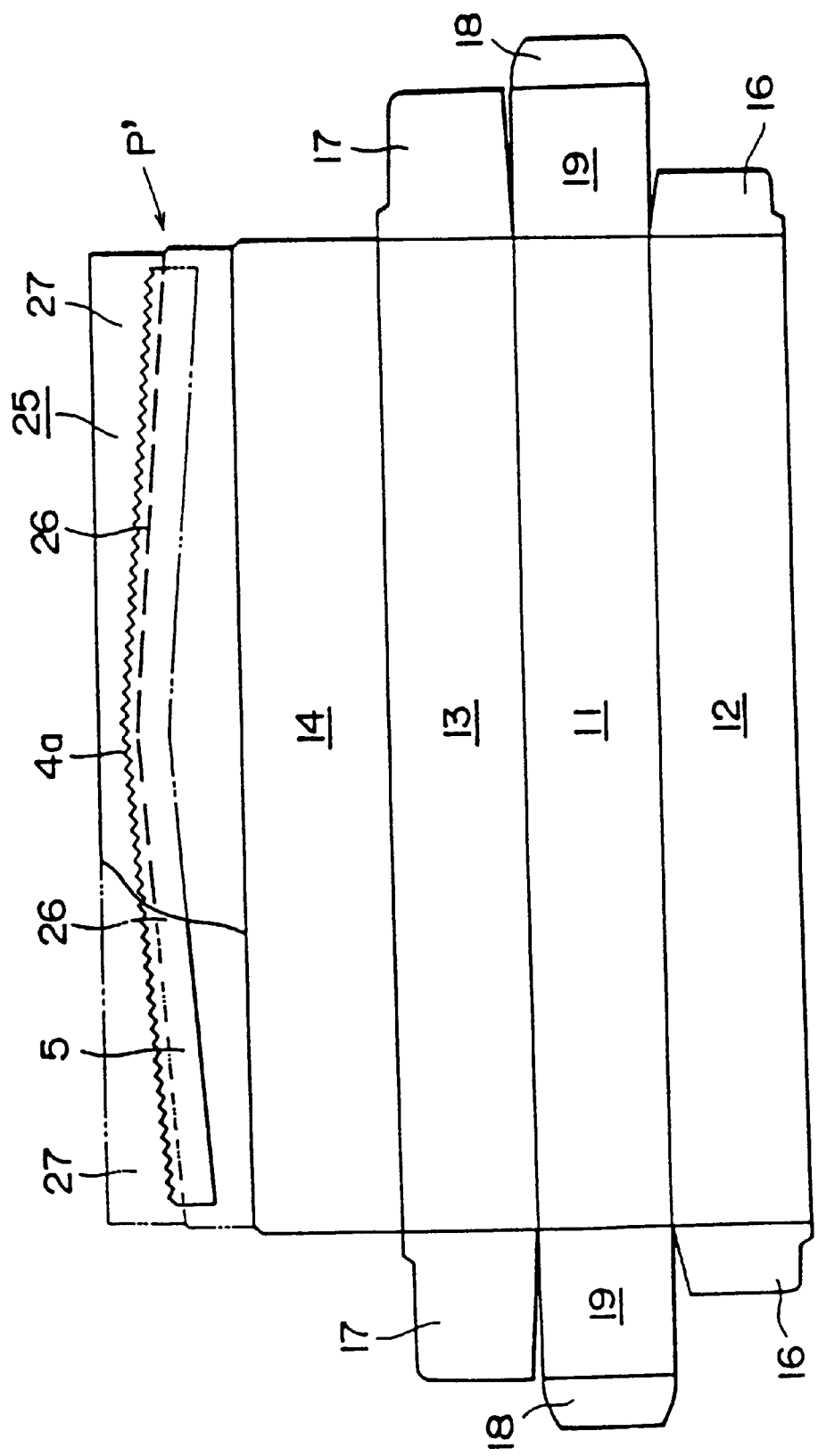
FIG. 8 is a view showing another carton blank provided with a vulcanized fiber sheet having a serrated cutting edge.

A description will be given of an example in which the shape of said sheet having a serrated cutting edge, or strictly speaking, the distribution of the cutting teeth thereof, is not straight but bent angularly in the lengthwise direction. In a sheet 5 shown in FIG. 8, which is a flat sheet having a serrated cutting edge, the distribution of the cutting teeth thereof in the plan view has a protruded center in the lengthwise direction and the edge portions on both sides of said center inclined toward the ends. This sheet is adhered to a developed carton blank P' which is similar to said carton blank in the above-mentioned example.

Sheet 5 having a serrated cutting edge is adhered by means of a pressure sensitive adhesive as used in the above-mentioned example or an adhesive of a hot melt type or any other suitable adhering means to an illustrated position on a cover panel of the carton blank.

This carton blank will be described in brief. A cover panel 25 is continuously provided on the upper side of a top wall panel 14. Said sheet 5 having a serrated cutting edge, which sheet is different in shape from the sheet in the above-mentioned example, is adhered to the cover panel. A perforated line 26 corresponding to the shape of said sheet 5 is provided on the cover panel. To take out a rolled film or sheet contained within the carton, a separation piece 27 on the outside of said perforated line 26 is cut off along said perforated line 26 and the carton is opened. After the separation piece 27 is separated from the cover panel 25, the serrated cutting edge 4a of said sheet 5 protrudes from the edge of the cover panel. Therefore, it is possible to cut said film or sheet to a desired length by means of said serrated cutting edge. It is to be noted that portions or members of said carton blank P' corresponding to those in the above-mentioned example (See FIG. 5) are represented by the same symbols thereas.

EXAMPLE 5

The serrated cutting edge of the sheet according to the present invention may comprise cutting teeth of the same shape, said cutting teeth being uniformly distributed, such being similar to saw teeth made of a metal which have been generally used. A cutting edge having the cutting teeth described below cuts better than the cutting edge mentioned above. A wrapping film having a large elongation, such as a film of polyvinyl chloride, is more difficult to cut than a film having a smaller elongation. This disadvantage is removed by using a cutting edge having cutting teeth which have the following shapes and distribution.

Figure 9:
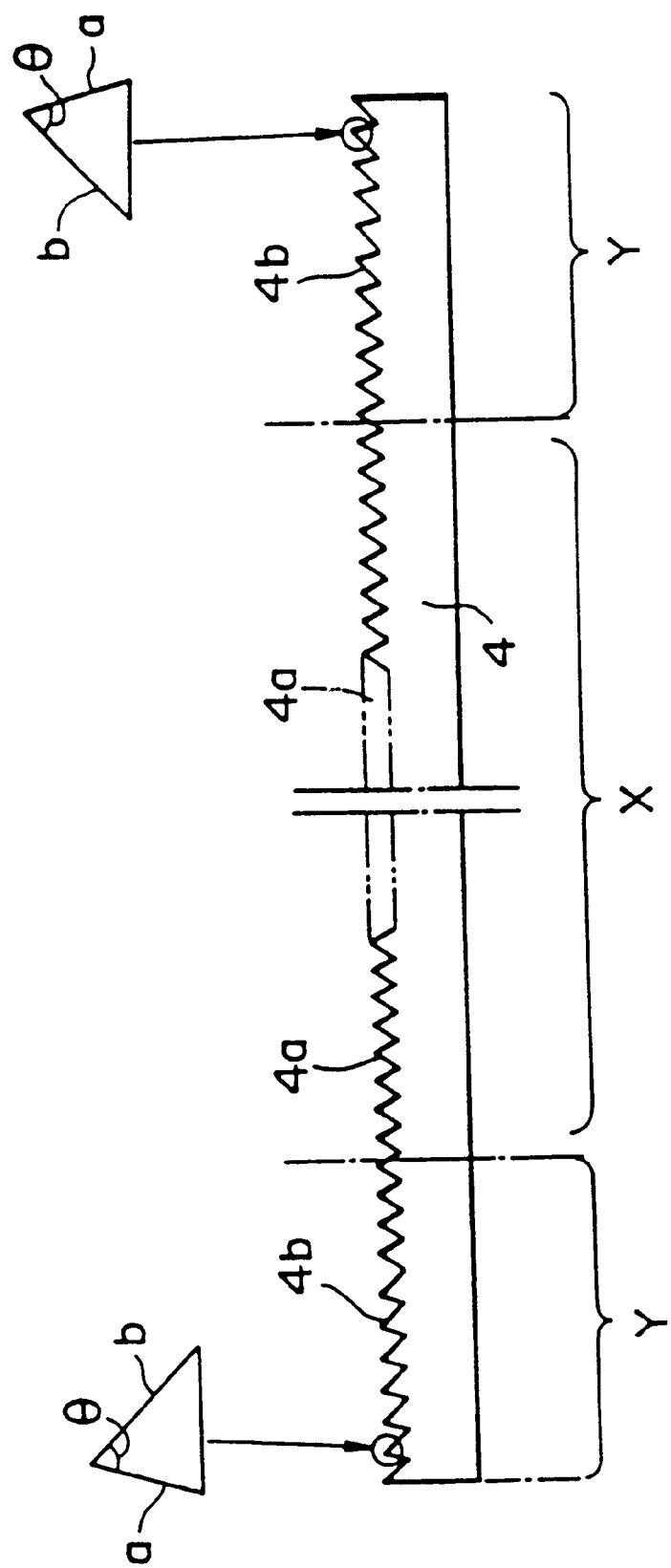
FIG. 9 is a plan view of a vulcanized fiber sheet having a serrated cutting edge. The plan view shows the shapes and the distribution of the cutting teeth in the serrated cutting edge.

Description will be made with reference to FIG. 9. In forming a serrated cutting edge on the vulcanized fiber blank, the cutting teeth near the ends of a rectangular sheet 4 are shaped different from the cutting teeth in the central portion thereof as shown in FIG. 9. Each cutting tooth 4a in the central portion X has the shape of an isosceles triangle having a vertical angle of about 60°. Each cutting tooth 4b on both sides Y thereof has the shape of a triangle in which a<b, where "a" is the length of a side near the end of said sheet and "b" is the length of a side near the central portion, these sides forming the vertical angle θ. In other words, the vertex of each of these cutting teeth faces outside. In Example 5, two sheets were prepared, one (Example 5A) having a vertical angle θ of 58°, the other (Example 5B) having a vertical angle θ of 49°. In both of these sheets, the portion Y near each end has a length of about 20 mm and the central portion X has a length of 260 mm. The sheet prepared in Example 1 has cutting teeth shown in FIG. 1. all of which have the same shape as the cutting teeth in said central portion. These sheets of Example 1, Example 5A and Example 5B were attached to respective cartons of the same construction, and the cutting quality thereof was tested, the results of which are shown in Table 1.

TABLE 1

| Examples | Example 1 | Example 5A | Example 5B |
|---|---|---|---|
| Films cut | | | |
| Note 1 | 1:1 | 1:1.16 | 1:1.47 |
| Note 2 | about 60° | about 58° | about 49° |
| Polyvinylidene chloride | Easy to ○ cut | Very easy ⊚ to cut | Easy to ○ cut |
| Polyvinyl chloride | Difficult △ to cut | Possible ● to cut | Easy to ○ cut |
| Polyethylene | Possible ● to cut | Easy to ○ cut | Very easy ⊚ to cut |

Note 1: Two sides forming the vertical angle a:b
Note 2: Vertical angle θ (pitch 1.5 mm)

As shown in Table 1, the sheets having a serrated cutting edge according to Example 5 even cut well films of polyvinylidene chloride or polyvinyl chloride having a relatively large elongation. It is assumed that this is because the cutting teeth near the ends, the vertex of each of which faces outside, cut into the film easily at the beginning of the cutting and grasp it surely without slipping.

The vertical angle θ is preferably within a range of about 45° to 60°. The number of said cutting teeth 4b is above 3, preferably 10, The portion Y near the end has a length of above 4 mm, preferably between 10 and 20 mm.

EXAMPLE 6

Adhering the sheet having a serrated cutting edge according to the present invention to a carton blank by the ultrasonic adhesion method through the moisture-proof film formed on the surface of said sheet will now be described in detail with reference to FIGS. 10 to 14.

It is of course possible to use a usual adhesive such as a pressure sensitive adhesive in adhering said sheet to the carton. It is more advantageous to adhere the sheet to the carton firmly without using any adhesive. Usually, forming the serrated cutting edge by blanking and said adhesion is continuously made mechanically. Therefore, if said adhesive is used, some of it may stick to the blanking die and lower the precision of blanking. If the sheet is fixed to the carton by a heat seal method without using any adhesive, the cutting edge of the blanking die may expand by heat, the die engagement being affected thereby, the cutting edge of the die being damaged.

To solve the above-mentioned problems, the present invention adheres the sheet having a serrated cutting edge to the carton blank by the ultrasonic adhesion method which is free from said drawbacks. This ultrasonic adhesion method is effective particularly when the moisture-proof film is made of a polyolefin resin having a relatively low melting point.

Figure 10:
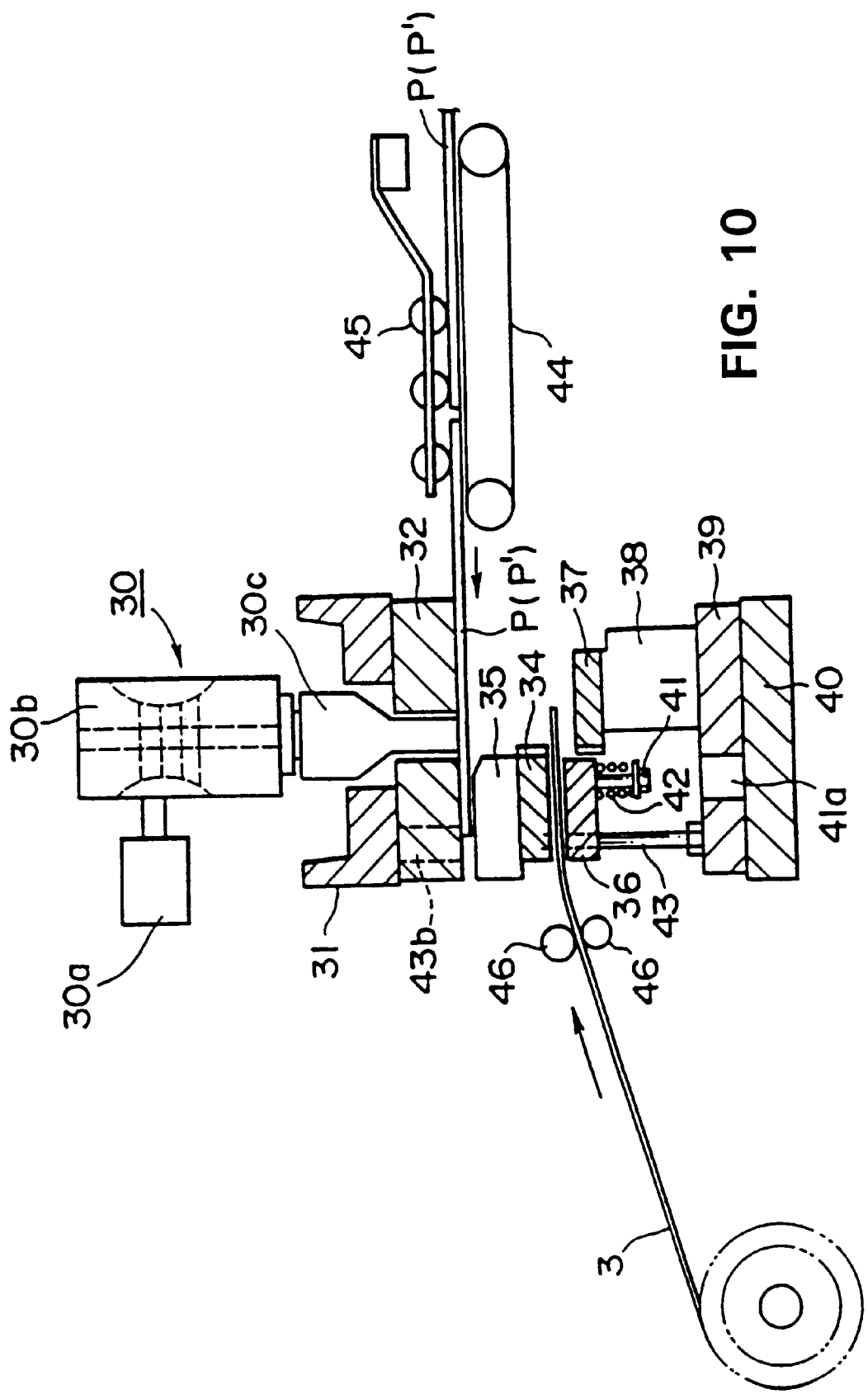
FIG. 10 is a side view showing a device for adhering said sheet having a serrated cutting edge to a carton blank.

Reference symbol 20 in FIG. 10 represents an ultrasonic adhering device, which is mounted in an upper bolster 31 of a known die set mechanism for example. Said ultrasonic adhering device comprises an ultrasonic generator 30a, an ultrasonic vibrator 30b and a horn 30c. Electric vibrations generated by said ultrasonic generator 30a are converted into mechanical vibrations by the ultrasonic vibrator 30b. Then, said mechanical vibrations are amplified by the horn 30c. The amplified vibrations are transmitted to the moisture-proof film of the sheet having a serrated cutting edge and melts said film by heating it. Thereby the sheet 3, in which said serrated cutting edge 4a has just been formed, is adhered to the carton blank P or P'. The adhesion between the sheet and the carton blank is further increased by coating the adhesion portion of said carton blank in advance with an anchoring agent such as an emulsion of polyethylene imine, polyethylene or polyvinylidene chloride resin, said anchoring agent being dried so as to form a film.

Figure 11:
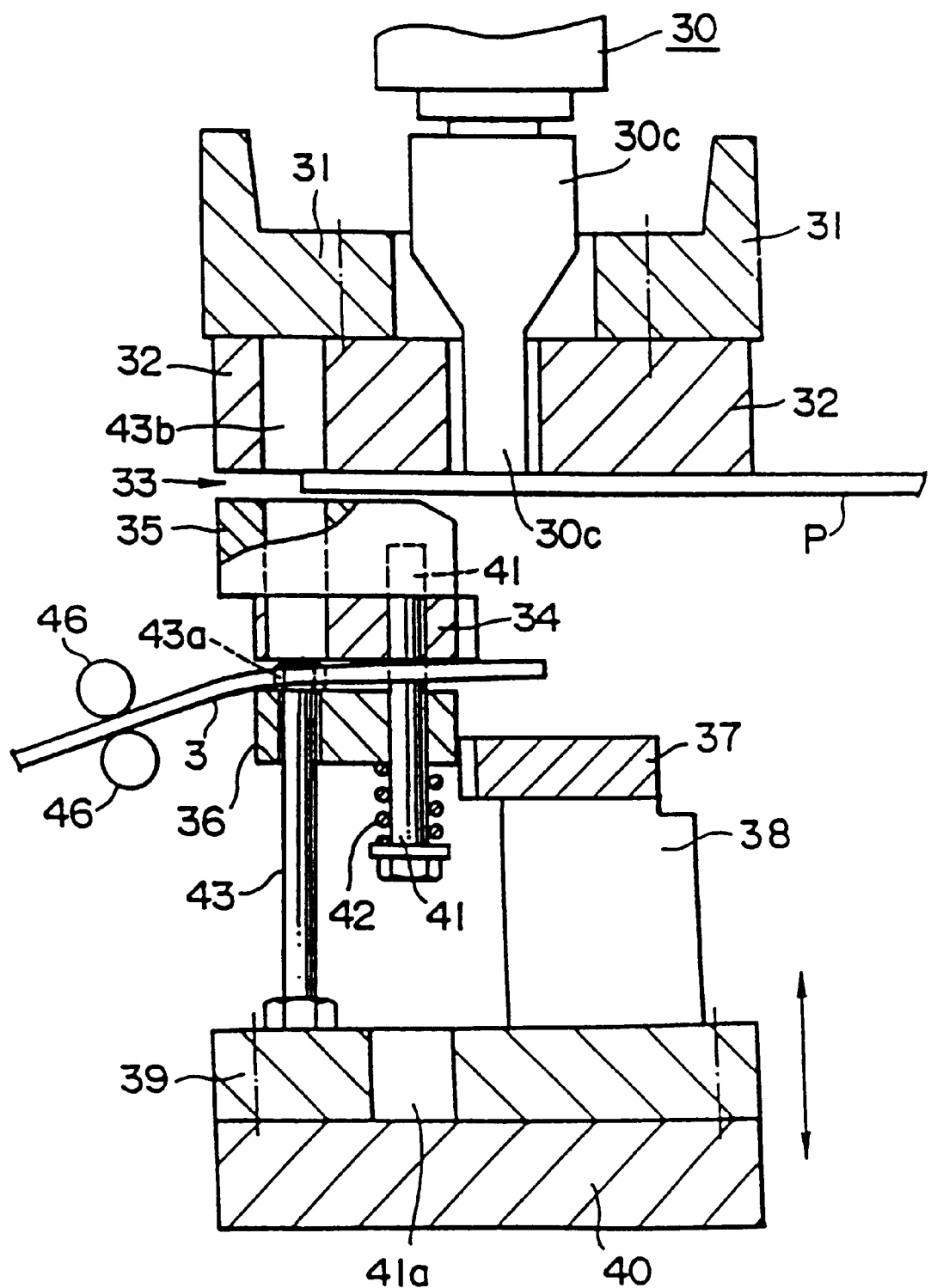
FIG. 11 is an enlarged sectional view of said device in which a die setting mechanism is open.
Figure 12:
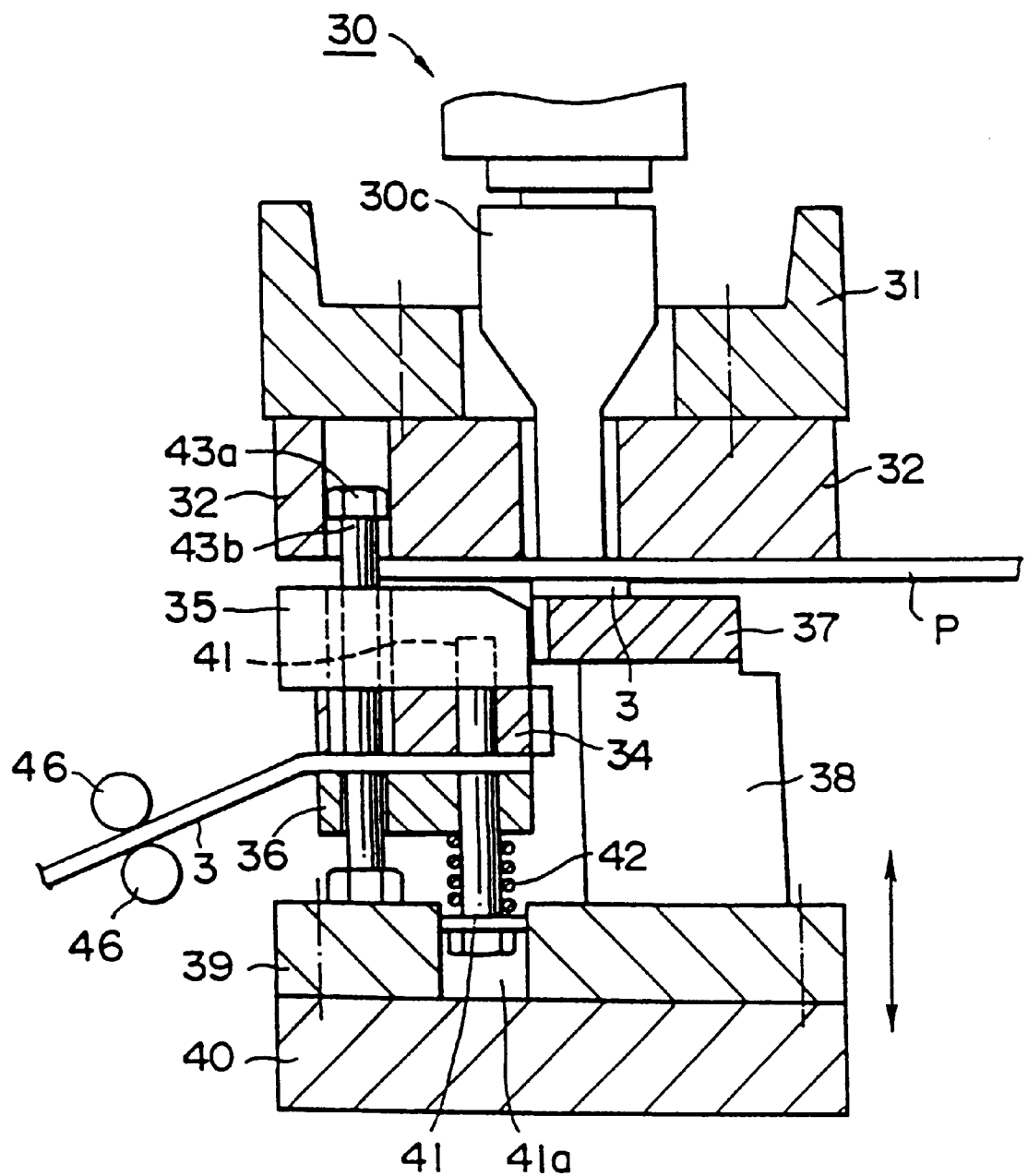
FIG. 12 is an enlarged sectional view of said device in which said die setting mechanism is closed.

In FIGS. 10 to 12, reference symbol 32 represents an upper plate in said die set mechanism. Immediately below said upper plate 32, there is a holder plate 35 by which an upper cutting edge 34 is held, the clearance 33 between said upper plate 32 and said holder plate 35 being very small. The upper cutting edge 34 is fixed to the lower surface of said holder plate 35. A sheet clamper 36 is disposed under said upper cutting edge 34, there being a certain clearance between said upper cutting edge 34 and said sheet clamper 36. A lower cutting edge 37 corresponding to said upper cutting edge 34 is disposed beside and below said sheet clamper 36, said lower cutting edge 37 and said upper cutting edge 34 facing each other. (See FIG. 13) Reference symbol 38 represents a mount of the lower cutting edge 37, reference symbol 39 representing a lower plate, reference symbol 40 representing a lower bolster, these being adapted to be integrally moved up and down by a cam mechanism or a cylinder mechanism not shown in the figures.

Reference symbol 41 represents a stay bolt embedded in a lower portion of said holder plate 35, said stay bolt 41 passing through said upper cutting edge 34 and said sheet clamper 36. A protruding portion of said stay bolt 41 is provided with a spring 42 which has a tendency to push up the lower surface of said sheet clamper 36. Said lower plate 39 has a recess 41a in which said stay bolt 41 sinks when the lower bolster 40 of the die set mechanism moves up. Beside said stay bolt 41, there is a guide rod 43 which gives a small clearance between said sheet damper 36 and said upper cutting edge 34 by pulling down said sheet clamper 36 within a certain range against the force of the spring 42 when the die set mechanism opens. The guide rod 43 is provided at its top with a bolt head 43a which contacts the upper surface of the sheet damper 36 as shown by dotted lines in FIG. 11. Said bolt head 43a pulls down said sheet damper 36. A blank sheet 3 for forming a serrated cutting edge is sent into the clearance between the sheet clamper 36 and the upper cutting edge 34. Said guide rod 43 moves up and down when the die set opens and closes. As the guide rod 43 moves up and down, the bolt head 43a moves through a hole 43b bored through all of said upper cutting edge 34, holder plate 35 and upper plate 32.

Figure 13:
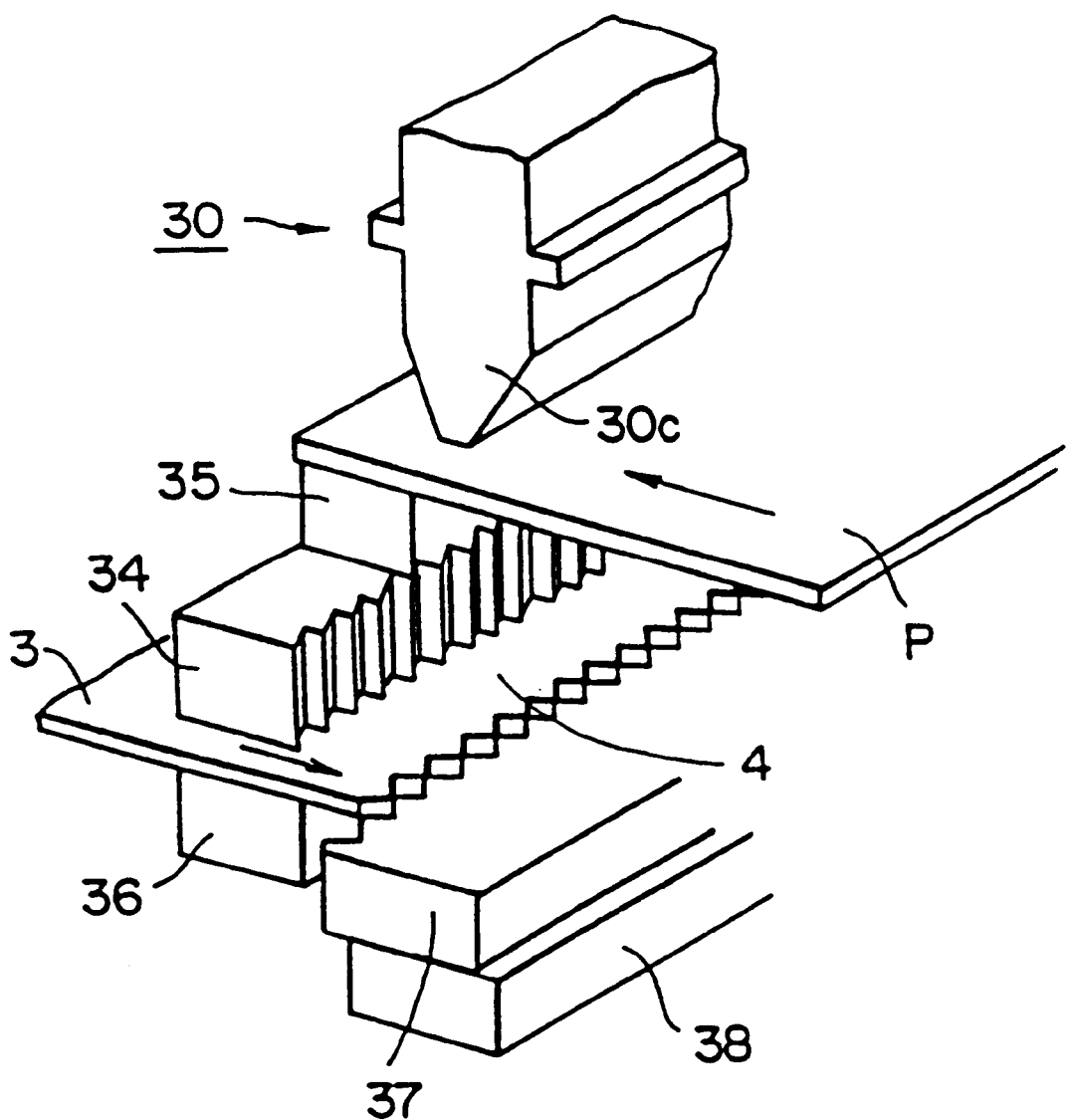
FIG. 13 is an exploded perspective view showing an essential portion of the above device.
Figure 14:
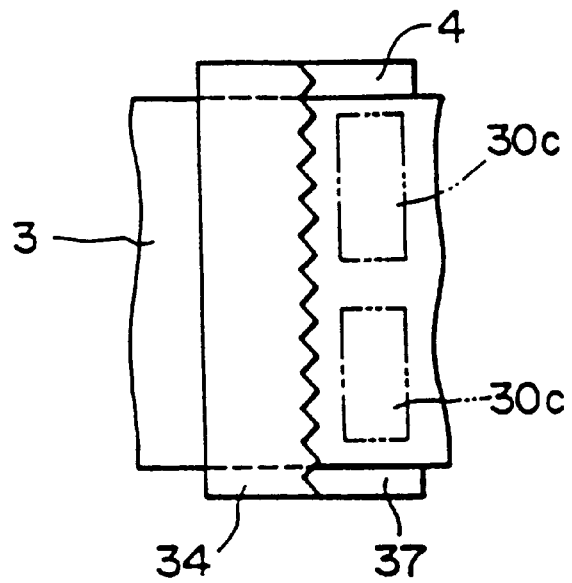
FIG. 14 is a schematic plan view for explaining a method of adhesion according to the present invention.

A carton blank P is supplied to a position under said upper plate 32 so as to oppose said ultrasonic adhesion horn 30c. Beside said die set mechanism, there are a belt conveyor 44 for feeding said blank and pressing rollers 45 above said belt conveyor 44 as shown in FIG. 10. Said sheet 3 not having a serrated cutting edge is supplied through nip rolls 46 to said die set mechanism. The relationship between said upper cutting edge 34 and said lower cutting edge 37 is shown in FIG. 13, each of them having a serrated cutting edge, these cutting edges being engageable with each other.

When the die set mechanism is in an open state as shown in FIG. 11, the carton blank P is supplied by means of said belt conveyor 44 and said pressing rollers 45 to a position under said upper plate and directly below said adhesion horn 30c, as shown by an arrow, the blank sheet 3 for forming a serrated cutting edge being supplied between said upper cutting edge 34 and said sheet clamper 36. When the die set mechanism is in an open state, the bolt head 43a of said guide rod 43 pushes down the sheet damper 36 as shown in FIG. 11. Therefore, a certain clearance is formed between the clamper 36 and the upper cutting edge 34. Through this clearance, the blank sheet 3 is intermittently supplied from the nip rolls 46. After the blank sheet is supplied, the die set mechanism starts closing. Then, said bolt head 43a moves upward, thus the pushing down of the sheet clamper 36 by the bolt head 43a being released. Now, the sheet clamper 36 is pushed toward the upper cutting edge 34 by the force of the spring 42 attached to the stay bolt 41. Therefore, the sheet 3 is firmly held between the clamper 36 and the upper cutting edge 34.

The sheet 3 for forming a serrated cutting edge is supplied as mentioned above so that a certain length thereof protrudes from the upper cutting edge 34 over the lower cutting edge 37 as shown in the figure. Then, the die set mechanism starts closing as shown in FIG. 12. Now the lower cutting edge 37 moves upward and cuts the blank sheet 3 to form a serrated cutting edge. At the same time, the lower cutting edge 37 pushes up the sheet having the serrated cutting edge against a predetermined portion of the carton blank P waiting above the sheet as shown in FIG. 12. By the pushing of the sheet against the carton blank, a pressure-sensitive switch (not shown) of the ultrasonic adhering device 30 is turned on to start the adhering device. The adhering device melts the moisture-proof film formed on the surface of the sheet to adhere the sheet 3 to the predetermined portion of the carton blank P.

After the adhesion is finished, the die set mechanism opens and the carton blank to which the sheet having the serrated cutting edge has been adhered is taken out of the die set mechanism. Then, a new carton blank and a new blank sheet are supplied, said blank sheet being adhered to the carton blank in the same way as mentioned above.

According to the above-mentioned example, the vulcanized fiber sheet having a serrated cutting edge is adhered through the moisture-proof film formed on the surface of the sheet to the carton blank without using any adhesive. Therefore, the serrated cutting edge can be attached to the carton quickly, surely and at a low cost. In experiments made by the inventors, a rectangular sheet having a serrated cutting edge, 0.35 mm thick, 30 cm×0.8 cm, was adhered to a carton blank at a speed of 120 shots per minute. This adhesion speed is almost equal to the speed at which a conventional metal cutting edge is fixed to a carton blank.

Adhesion tests were made to compare sheets adhered to carton blanks as mentioned above with sheets adhered to carton blanks by other adhering means. The results of the test are shown in Table 2 below.

TABLE 2

(Adhesion Test)

| Thickness of sheet having serrated cutting edge | PE film supersonic adhesion | Adhesive of 2-liquid type used | Adhesive of 1-liquid type used | Hot-melt adhesive used | Epoxy resin used |
|---|---|---|---|---|---|
| 0.25 mm | ○ | x | x | x | ○ |
| 0.35 mm | ○ | x | ○ | ○ | ○ |

Test conditions: 40° C., 90% RH, 24 Hr
Note: Epoxy resin has good adhesion but extremely lowers productivity because its curing time is long.

As apparent from the table above, satisfactory adhesion was confirmed after the sheets were let alone in a high-humidity atmosphere for 24 hours, even in the case of thin sheets having a serrated cutting edge.

Figure 15:
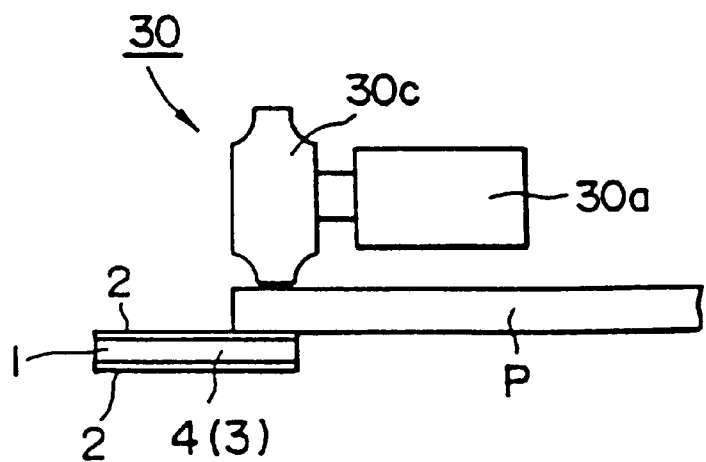
FIG. 15 is a side view showing a modified example of an ultrasonic adhesion horn.

The ultrasonic adhering device is not limited to the device described above and may comprise a vibrator 30*a* and a horn 30*c*, energy generated by said vibrator 30*a* being converted into vibrations in the vertical directions by said horn as shown in FIG. 15.

As apparent from the description above, in the present invention, the die set mechanism may contain therein, for example, the ultrasonic adhering device and the serrated cutting edge forming device, said forming device comprising the upper cutting edge and the lower cutting edge, a blank sheet being cut to a predetermined width by utilizing the opening and closing operations of the die set, said sheet being adhered to a predetermined position of a carton blank by means of the ultrasonic adhesion method.

The carton blank may preferably be pattern coated in advance at a position, to which the sheet having a serrated cutting edge is to be adhered, with a substance which facilitates adhesion, then said carton blank is supplied to the die set mechanism. Said substance may be, for example, an emulsion of denatured polyethylene. Said substance increases the adhesive strength by said ultrasonic adhesion method as well as the adhesion speed.

The present invention is not limited to the examples described above and may be modified in various ways within the scope of the invention.

EFFECTS OF THE INVENTION

To confirm the effects of said moisture-proof film in the present invention, the following tests were made by means of the following samples:

Sample A: Blank sheet prepared in accordance with Example 3. This was prepared by impregnating a vulcanized fiber sheet having a basis weight of 400 g/m$^2$ (thickness 0.35 mm) in advance with a melamine resin solution (concentration 5%), said sheets being dried, and then a low-density polyethylene film having a thickness of 20$\mu$ being formed on both of the two surfaces of said sheet.

Sample B: This was prepared by impregnating a vulcanized fiber sheet having the same basis weight as above (thickness the same as above) in advance with a melamine resin solution (concentration 5%).

Sample C: This was prepared by impregnating a vulcanized fiber sheet having the same basis weight as above (thickness the same as above) in advance with a melamine resin solution having a concentration of 5%, and said sheet being coated with an urethane resin liquid in an amount of 15 g/m$^2$ (solid matter).

Rectangular sheets having a width of 8 mm and a length of 100 mm were cut out of each of said samples. The direction in which said serrated cutting edge was to be formed was the lengthwise direction of each sheet as shown in FIGS. 3 and 4. Two types of these rectangular sheets were obtained. In one of the two types, the lengthwise direction was parallel to MD (shown as "long." in Tables 3 and 4 below). In the other of the two types, the lengthwise direction was parallel to CD (shown as "lat." in Tables 3 and 4 below). The samples were tested as to the degrees of the contraction and elongation thereof according to the differences of humidity.

The tests were made as follows: Each of said samples was let alone in an atmosphere of 23° C. and 65% RH for 24 hours and the elongation in the lengthwise direction of each sample was determined, the value of said elongation serving as a reference value. Then, each sample was let alone in an atmosphere of 20% RH or 90% RH for a certain period of time (for hours shown in the tables below). Now, the degree of contraction or elongation, that is, the ratio of contraction or elongation to said reference value by the change of conditions was determined. Tables 3 and 4 show said ratio of contraction or elongation in terms of percentage.

TABLE 3

Contraction (65 RH → 20% RH, 23° C.)

unit: %

| Hour | Sample A long. | Sample A lat. | Sample B long. | Sample B lat. | Sample C long. | Sample C lat. | Paperboard long. | Paperboard lat. |
|---|---|---|---|---|---|---|---|---|
| 1 | −0.07 | −0.24 | 0.02 | 1.21 | 0.00 | −0.76 | — | — |
| 3 | −0.11 | −0.36 | −0.07 | −1.49 | −0.10 | −1.15 | — | — |
| 6 | −0.15 | −0.48 | −0.12 | −1.63 | −0.18 | −1.40 | −0.14 | −0.36 |
| 12 | −0.19 | −0.57 | −0.14 | −1.70 | −0.24 | −1.59 | — | — |
| 18 | −0.21 | −0.69 | −0.14 | −1.72 | −0.28 | −1.70 | — | — |
| 24 | −0.25 | −0.77 | −0.14 | −1.75 | −0.28 | −1.76 | — | — |

Note:
"long." means longitudinal direction.
"lat." means lateral direction.

TABLE 4

Elongation (65 RH → 90% RH, 23° C.)

unit: %

| Hour | Sample A long. | Sample A lat. | Sample B long. | Sample B lat. | Sample C long. | Sample C lat. | Paperboard long. | Paperboard lat. |
|---|---|---|---|---|---|---|---|---|
| 1 | 0.01 | 0.07 | 0.12 | 0.58 | 0.05 | 0.19 | — | — |
| 3 | 0.04 | 0.10 | 0.09 | 1.12 | 0.09 | 0.42 | — | — |
| 6 | 0.05 | 0.17 | 0.07 | 1.28 | 0.10 | 0.66 | 0.08 | 0.51 |
| 12 | 0.08 | 0.29 | 0.03 | 1.35 | 0.11 | 1.09 | — | — |
| 18 | 0.11 | 0.39 | 0.02 | 1.35 | 0.10 | 1.11 | — | — |
| 24 | 0.12 | 0.48 | 0.00 | 1.35 | 0.09 | 1.23 | — | — |

Note:
"long." means longitudinal direction.
"lat." means lateral direction.

As apparent from Tables 3 and 4, according to the present invention, even the vulcanized fiber sheet, which is relatively easily affected by moisture in the atmosphere, can be made less liable to be affected by humidity by said moisture-proof film formed on the surface thereof. The moisture-proofing treatment by forming the moisture-proof film according to the present invention has effects much better than conventional water-resistant articles by said melamine resin, urethane resin, etc. Preferably, the moisture-proof film is a polyolefin resin film having a relatively low moisture permeability.

The water-resisting or waterproofing treatment by a melamine resin, urethane resin, etc. has been considered to be indispensable. However, according to the present invention, the use of said moisture-proof film decreases the necessity of said treatment and it is possible to dispense with the expensive urethane resin. As a result, it is possible to provide a practical and less expensive pro duct. The vulcanized fiber laminated with polyethylene is compared with the vulcanized fiber coated with a urethane resin as follows: The unit price of the resin used in the former is only ⅕ of the unit price of the resin used in the latter. The efficiency of treatment in the former is 30 times as large as the efficiency of treatment in the latter. Therefore, the product of the present invention is very inexpensive.

Thus, in the present invention, the vulcanized fiber sheet provided with said moisture-proof film is used as a blank. and a serrated cutting edge is formed on the vulcanized fiber sheet by utilizing its very high elasticity and rigidity. Therefore, the serrated cutting edge is free from deformation or damage by an external force and always cuts very well. Said sheet of the present invention maintains its dimensional stability even when it is kept in a kitchen, etc. having a high humidity. Therefore, said sheet having a serrated cutting edge according to the present invention is suitable for cutting cooking sheets of a resin film, paper, metal foil, treated paper, etc. used for packing foods.

Since said sheet having a serrated cutting edge is made of said vulcanized fiber, the sheet does not injure fingers, even when it is attached to a carton. After use, the whole carton having said sheet may be burned as it is, with no residue being left, unlike conventional metal cutting edges.

The sheet having a serrated cutting edge and attached to a carton is almost free from dimensional change by moisture in the atmosphere. Particularly, there is no relative dimensional change by moisture in the atmosphere between said sheet and the paperboard forming the carton. Therefore, said sheet attached to the carton is free from being removed therefrom or deformed by moisture and has a stable cutting ability.

The contraction and elongation by moisture of the paperboard forming the carton are shown in Tables 3 and 4 above.

As compared with a serrated cutting edge in which all the cutting teeth have the shape of a uniform isosceles triangle, a serrated cutting edge in which each cutting tooth in the end portions of the cutting edge has the shape of a scalene triangle inclined outward, cuts surely into a film without slipping and is effective in cutting films having a large elongation such as polyethylene film and polyvinyl chloride film.

If the sheet having a serrated cutting edge is adhered to the carton by means of said ultrasonic adhesion method of the present invention and by utilizing said moisture-proof film, then the following advantages will be obtained:
(1) Since no adhesive is used, the production cost is reduced and the sheet can be adhered to the carton at a speed equivalent to the speed of attaching conventional metal cutting edges to the carton.
(2) No adhesive sticks to the die cutting edges for forming the serrated cutting edges.
(3) Adhesion by utilizing ultrasonic waves does not transmit heat to the die cutting edges. Therefore, the die cutting edges are free from troubles such as damages by improper engagement.
(4) When a metal edger shown in FIG. 10, which is an example of the machine for forming a serrated cutting edge, is used, it is possible to adhere said sheet having a serrated cutting edge to a carton blank by a single process by means of said ultrasonic adhesion method.

After use, carton cases including the sheets of the present invention can be burned as they are or recycled as a waste paper pulp. Thus, the present invention is useful also in saving resources and preventing environmental contamination.

What is claimed is:

1. A vulcanized fiber sheet having a serrated cutting edge, comprising a vulcanized fiber blank having two outer surfaces provided with a moisture-proof low-density polyethylene film, said serrated cutting edge being formed on at least one edge of said sheet.

2. A vulcanized fiber sheet having a serrated cutting edge as claimed in claim 1, wherein said moisture-proof film is formed over a water-resisting agent applied to said vulcanized fiber blank.

3. A vulcanized fiber sheet having a serrated cutting edge as claimed in claim 1, wherein said sheet has the shape of a rectangle and a plurality of cutting teeth provided on the cutting edge thereof, each cutting tooth in a central portion of said cutting edge having the shape of an isosceles triangle, each cutting tooth provided at two outer end portions of said cutting edge having the shape of a scalene triangle inclined away from said central portion of said cutting edge.

4. A carton to which a vulcanized fiber sheet having a serrated cutting edge and two outer surfaces is adhered, said carton having a carton body and a cover, said carton body comprising a bottom wall panel, a front wall panel, a rear wall panel and side panels, said cover covering an opening of said carton body, a moisture-proof film being formed on the two outer surfaces of said vulcanized fiber sheet, said moisture-proof film being a low density polyethylene film.

5. A carton to which a vulcanized fiber sheet having a serrated cutting edge as claimed in claim 4, is adhered, wherein said sheet is adhered to a dried polyethylene emulsion applied to a carton blank.

6. A vulcanized fiber sheet having a serrated cutting edge as claimed in claim 2, wherein said water-resisting agent is one of a melamine resin and glyoxal.

7. A vulcanized fiber sheet having a serrated cutting edge as claimed in claim 1, wherein said serrated cutting edge has a thickness of from 0.2 to 0.5 mm.

8. A vulcanized fiber sheet having a serrated cutting edge as claimed in claim 7, wherein said serrated cutting edge has a thickness of from 0.25 to 0.35 mm.

9. A vulcanized fiber sheet having a serrated cutting edge as claimed in claim 3, wherein said scalene triangle has a vertical angle of about 58°.

10. A vulcanized fiber sheet having a serrated cutting edge as claimed in claim 3, wherein said scalene triangle has a vertical angle of about 49°.

11. A carton to which a vulcanized fiber sheet having a serrated cutting edge and two outer surfaces is adhered as claimed in claim 4, wherein said serrated cutting edge has a thickness of 0.2 to 0.5 mm.

12. A carton to which a vulcanized fiber sheet having a serrated cutting edge and two outer surfaces is adhered as claimed in claim 4, wherein said serrated cutting edge has a central portion with a plurality of cutting teeth having the shape of an isosceles triangle and two outer portions having a plurality of cutting teeth having the shape of a scalene triangle inclined away from said central portion of said serrated cutting edge.

13. A method of adhering a vulcanized fiber sheet having a serrated cutting edge to a carton blank, said carton blank comprising a bottom wall panel, a front wall panel, a rear wall panel, side panels and a cover, said method comprising the steps of forming a moisture-proof low-density polyethylene film on said vulcanized fiber sheet and adhering said vulcanized fiber sheet through said moisture-proof film to a predetermined portion of said carton blank by an ultrasonic adhesion method.

14. A method as claimed in claim 13, wherein said serrated cutting edge has a thickness of 0.2 to 0.5 mm.

15. A method as claimed in claim 13, wherein said serrated cutting edge has a central portion with a plurality of cutting teeth having the shape of an isosceles triangle and two outer portions having a plurality of cutting teeth having the shape of a scalene triangle inclined away from said central portion of said serrated cutting edge.

16. A vulcanized fiber sheet having a serrated cutting edge as claimed in claim 1, wherein a waterproof film is formed on the serrated cutting edge.

17. A vulcanized fiber sheet having a serrated cutting edge as claimed in claim 16, wherein said waterproof film is formed from an electron beam curing resin or an ultraviolet curing resin.

* * * * *

UNITED STATES PATENT AND TRADEMARK OFFICE
CERTIFICATE OF CORRECTION

PATENT NO.   : 6,173,876 B1
DATED        : January 16, 2001
INVENTOR(S)  : Mitsuhiro Sano et al.

It is certified that error appears in the above-identified patent and that said Letters Patent is hereby corrected as shown below:

Title page,
Item [73], in the Assignee, change "Oji Paper Co., Ltd." to
-- OJI PAPER CO., LTD.
  Tokyo, Japan --
  and
  TOYO FIBRE CO., LTD.
  Numazu-shi, Shizuoka-ken 410-03, Japan --.

Signed and Sealed this

Twenty-first Day of January, 2003

JAMES E. ROGAN
*Director of the United States Patent and Trademark Office*